US010862090B2

(12) United States Patent
Huang et al.

(10) Patent No.: US 10,862,090 B2
(45) Date of Patent: Dec. 8, 2020

(54) COMPOSITE SEPARATOR, PREPARATION METHOD OF THE SAME, AND ELECTROCHEMICAL DEVICE USING THE SAME

(71) Applicant: Contemporary Amperex Technology Co., Limited, Ningde (CN)

(72) Inventors: Huafeng Huang, Ningde (CN); Qisen Huang, Ningde (CN); Shiwen Wang, Ningde (CN); Chengdu Liang, Ningde (CN)

(73) Assignee: Contemporary Amperex Technology Co., Limited

( * ) Notice: Subject to any disclaimer, the term of this patent is extended or adjusted under 35 U.S.C. 154(b) by 90 days.

(21) Appl. No.: 16/211,582

(22) Filed: Dec. 6, 2018

(65) Prior Publication Data

US 2019/0207187 A1    Jul. 4, 2019

(30) Foreign Application Priority Data

Dec. 29, 2017 (CN) .......................... 2017 1 1478896

(51) Int. Cl.
*H01M 2/16* (2006.01)
*H01M 2/14* (2006.01)
(Continued)

(52) U.S. Cl.
CPC ............. *H01M 2/16* (2013.01); *H01M 2/145* (2013.01); *H01M 2/166* (2013.01);
(Continued)

(58) Field of Classification Search
CPC ............ H01M 2/02; H01M 2/12; H01M 2/14; H01M 2/16
See application file for complete search history.

(56) References Cited

U.S. PATENT DOCUMENTS

2011/0171535 A1* 7/2011 Ohinshi ............ H01M 10/0562
429/247
2013/0287937 A1* 10/2013 Joo ....................... H01M 2/166
427/126.4
(Continued)

FOREIGN PATENT DOCUMENTS

JP    2017506419 A    3/2017

OTHER PUBLICATIONS

Celgard, Celgard Product Comparison, Datsheet Celgard 2400, Nov. 2009, p. 2, col. 2400, retrieved from: www.jobike.it/Public/data/Daniele%20Consolini/2012517114032_Celgard_Product_Comparison_10002.pdf. (Cited as technological background in EU Search Report).

(Continued)

*Primary Examiner* — Kenneth J Douyette
(74) *Attorney, Agent, or Firm* — Forge IP, PLLC

(57) ABSTRACT

The present disclosure relates to a composite separator, a preparation method of the composite separator, and an electrochemical device containing the composite separator. The composite separator includes a substrate and an inorganic layer disposed on at least one surface of the substrate. The substrate is a porous substrate, and the inorganic layer is an inorganic dielectric layer which is a continuous dense film layer with porosity lower than 10% and contains no binder. A thickness of the inorganic layer is 20 nm-1000 nm. An interfacial peeling force between the inorganic layer and the substrate is no less than 30 N/m. The separator of the present application has high wettability with respect to electrolyte, almost no thermal shrinkage, relatively high mechanical strength, and favorable corrosion resistance and durability performances, and thus, a battery using the separator has relatively high thermal stability and nailing strength.

15 Claims, 1 Drawing Sheet

(51) Int. Cl.
- *H01M 10/0563* (2010.01)
- *H01M 10/052* (2010.01)
- *H01M 10/42* (2006.01)
- *H01M 10/0525* (2010.01)

(52) U.S. Cl.
CPC ....... *H01M 2/1646* (2013.01); *H01M 2/1653* (2013.01); *H01M 2/1686* (2013.01); *H01M 10/052* (2013.01); *H01M 10/0525* (2013.01); *H01M 10/0563* (2013.01); *H01M 10/4235* (2013.01); *H01M 2300/0094* (2013.01)

(56) References Cited

U.S. PATENT DOCUMENTS

| | | | |
|---|---|---|---|
| 2014/0050965 A1* | 2/2014 | Ha | H01M 2/164 429/144 |
| 2014/0295245 A1* | 10/2014 | Miyazaki | H01M 2/18 429/144 |
| 2016/0204408 A1† | 7/2016 | Herle | |
| 2016/0351973 A1† | 12/2016 | Albano | |
| 2017/0288192 A1* | 10/2017 | Chen | H01M 10/0525 |

OTHER PUBLICATIONS

Lee, C.D., et al. "Mechanical properties of thin-film Parylene-metal-Parylene devices." Front. Mech. Eng. 1:10, pp. 1-14 (Sep. 8, 2015). doi: 10.3389/fmech.2015.00010.†

\* cited by examiner
† cited by third party

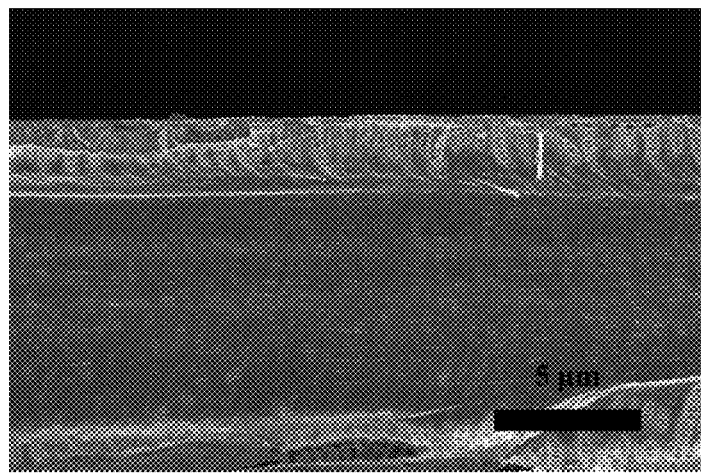

COMPOSITE SEPARATOR, PREPARATION METHOD OF THE SAME, AND ELECTROCHEMICAL DEVICE USING THE SAME

CROSS-REFERENCE TO RELATED APPLICATIONS

The present application claims priority to Chinese Patent Application No. 201711478896.4, filed on Dec. 29, 2017, the content of which is incorporated herein by reference in its entirety.

TECHNICAL FIELD

The present application relates to the field of energy storage and, in particular, relates to a composite separator, a preparation method of the composite separator, and an electrochemical device using the composite separator.

BACKGROUND

Lithium-ion batteries dominate the global secondary battery market due to advantages of high operating voltage, wide operating range, large specific energy, no pollution, and long service life, etc. Small-scale lithium-ion batteries with lower capacity have been widely used in fields such as mobile phones, notebook computers, power tools and so on. In recent years, with continuous development of the large-capacity battery technology as well as continuous advancement of vehicle technology, lithium-ion power batteries have also been gradually commercialized. Therefore, it becomes an important research topic for companies and research institutions to achieve high energy density and low cost of a power battery, and at the same time ensure that its safety performance is equivalent to or even higher than that of a fuel vehicle.

In the internal structure of a battery, a separator serving as a key component is usually a thin porous polymer film with properties of electron-isolation and ion-conduction, for ensuring that ions can be normally transmitted between positive and negative electrodes without short circuit. In recent years, in order to alleviate problems such as high thermal shrinkage percentage and poor electrolyte wettability of a single-polymer separator, a composite separator with a ceramic coating being coated on the surface of a polymer substrate is gradually becoming the key technology for improving safety performance of a battery. However, during application of this composite coating, there is still a series of problems, for example, agglomeration of ceramic particles in slurry, a large coating thickness of at least several micrometers, poor interfacial wettability between the coating and the substrate, and significant influence on a bonding force between the coating and the substrate exerted by binder distribution etc. As a result, during the coating process, long-term cycling or battery abuse, the coating layer on the separator surface may easily occur cracking, aging, porosity changing, or ceramic particles coming off, therefor the ion-conduction performance of the separator will deteriorate and even cause safety problems in severe situations.

SUMMARY

In view of this, a first aspect of the present application provides a composite separator including a substrate and an inorganic layer disposed on at least one surface of the substrate. The substrate is a porous substrate, and the inorganic layer is an inorganic dielectric layer which is a continuous dense film layer with porosity lower than 10% and contains no binder. A thickness of the inorganic layer is 20 nm-1000 nm. An interfacial peeling force between the inorganic layer and the substrate is no less than 30 N/m.

A second aspect of the present invention provides a preparation method of the composite separator, including: providing a substrate, wherein the substrate is a porous substrate; forming an inorganic layer on a surface of the substrate and at least a part of pores of the substrate by a vapor deposition method, wherein the inorganic layer a continuous dense film layer with porosity lower than 10%, a thickness of the inorganic layer is 20 nm-1000 nm, and an interfacial peeling force between the inorganic layer and the substrate is no less than 30 N/m.

A third aspect of the present application provides an electrochemical device including a positive electrode, a negative electrode, a separator, and electrolyte. The separator is the composite separator provided in the first aspect above.

The technical solution of the present application has at least the following beneficial effects:

(1) The dielectric layer formed on the surface of the polymer substrate by vapor deposition method has advantages of good film thickness uniformity and favorable film-substrate bonding force, which improves hydrophilicity of the separator while preventing the inorganic layer from peeling off in cases of long-term cycling and abuse, thereby increasing cycling usage life and safety performance of the battery. Also, an air permeability of the composite separator is guaranteed to be within a certain range to ensure favorable ion-conduction performance.

(2) The inorganic layer is a continuous dense structure, which is beneficial for improving mechanical strength of the composite separator, in particular, the puncture resistance performance (not lower than 300 gf), so as to prevent large particles in the battery from penetrating the separator, effectively improving yield of the battery. Moreover, tensile strength of the composite separator is increased, and the processing performance is excellent.

(3) Although the inorganic layer is a dense structure, the inorganic layer is at least one of inorganic oxide, inorganic fluoride, inorganic nitride, and inorganic hydroxide with excellent electron-isolation and ion-conduction performance, so that a battery using this separator still has favorable ion-conduction performance.

(4) Since the thickness of the inorganic layer on the surface of the composite separator is of nano-scale, the influence on the thickness of the separator can be substantially ignored compared with a porous substrate of several tens of micrometers, thereby effectively improving energy density of a secondary battery using the composite separator.

BRIEF DESCRIPTION OF DRAWINGS

FIG. 1 is an SEM photograph (5000×) of a cross section of a specific composite separator according to an embodiment of the present application.

DESCRIPTION OF EMBODIMENTS

Hereinafter, the present disclosure is further illustrated by the following embodiments and comparative examples. These embodiments are only for illustrating the present disclosure, and the present disclosure is not limited to the following embodiments. Without departing from scope of the technical solutions of the present disclosure, any modification or equivalent substitution to the technical solutions of the present disclosure should be included in the protection scope of the present disclosure. An object of the present disclosure is to provide a composite separator, a preparation method of the composite separator, and a lithium-ion battery using the composite separator.

First of all, the composite separator according to a first aspect of the present disclosure will be described.

The composite separator according to the first aspect of the present disclosure includes a substrate and an inorganic layer disposed on at least one surface of the substrate. The substrate is a porous substrate, and the inorganic layer is an inorganic dielectric layer containing no binder. The inorganic layer is a continuous dense film layer with porosity lower than 10%, and a thickness of the inorganic layer is 20 nm-1000 nm. An interfacial peeling force between the inorganic layer and the substrate is no less than 30 N/m. In the present disclosure, the inorganic layer with a continuous dense structure is provided on the surface of the porous substrate, which not only can improve the wettability of the polymer substrate and suppress thermal shrinkage of the substrate at high temperatures, but can also increase mechanical strength of the composite separator, especially the puncture resistance performance (no less than 300 gf) and the tensile strength, moreover the processing performance of the separator is also excellent. Therefore, safety performance, cycle performance and storage performance of the battery are improved, and a yield of the battery is also increased.

In the composite separator according to the first aspect of the present disclosure, a vapor deposition method is employed to prepare the inorganic dielectric layer on the surface of the porous substrate, so that bonding between the inorganic layer and the porous substrate is not achieved by the binder but the chemical bond between the high-energy gasified molecules and surface groups of the substrate. Therefore, the bonding between the inorganic layer and the substrate is favorable, avoiding safety problems caused by peeling of the coating in cases of long-term cycling and abuse. Since the surface of the substrate is tightly bonded with the inorganic layer, in a heated state, shrinkage of the polymer is inhibited by an opposite reaction from the inorganic layer on the surface, so that there is no further shrinkage of the polymer. In the present disclosure, when the thickness of the inorganic layer reaches 0.3 times the pore-diameter of the porous substrate or higher, the thermal shrinkage percentage of the composite separators at 90° C. decreases significantly. With an increase in the thickness of the inorganic layer, the thermal shrinkage is further decreased and the mechanical strength is further improved. When the thickness of the inorganic layer reaches 1000 nm or more, the thermal shrinkage is not further decreased and the mechanical strength is not further improved. Instead, due to the increase in the thickness of the inorganic layer, the air permeability of the composite separator is reduced, which negatively affects the dynamic performance of the battery. In the present disclosure, a nano-scale inorganic layer is composited on the surface of the porous substrate, which is beneficial for reducing an overall thickness of the composite separator in industrial products and improving energy density of the cell.

Since the separator is soaked in electrolyte throughout the life cycle of the battery, the interface between the coating layer and the porous substrate is influenced by the acid/alkali corrosion in the electrolyte, leading to a decrease in the bonding force between the film layers. If the bonding force between the inorganic layer and the substrate is lower than 30 N/m, it is easy for the inorganic layer to peel off in cases of long-term cycling or battery abuse, which will not only result in a risk of plugging pores of the substrate and a decrease in the ion conductivity of the battery, but may also cause a series of safety issues.

In the composite separator according to the first aspect of the present disclosure, the inorganic layer contains a material having electron-isolation property and ion-conduction performance, and the material is at least one of inorganic oxide, inorganic fluoride, inorganic nitride, or inorganic hydroxide. In the present disclosure, the inorganic layer is a continuous dense structure, thus, the ion conduction is mainly achieved by inorganic layer material. The at least one of inorganic oxide, inorganic fluoride, inorganic nitride, or inorganic hydroxide having electron-insulation and excellent ion-conduction performance used in the present disclosure imparts the battery using the separator with favorable ion-conduction performance and excellent dynamic performance.

In the composite separator according to the first aspect of the present disclosure, the inorganic layer contains at least one of aluminum oxide, hydrated alumina, silicon oxide, silicon nitride, titanium oxide, titanium nitride, zinc oxide, zinc nitride, magnesium oxide, magnesium nitride, zirconium oxide, zirconium nitride, calcium oxide, calcium nitride, barium oxide, or barium nitride.

In the composite separator according to the first aspect of the present disclosure, the inorganic layer is uniformly coated on at least one surface of the substrate and inner walls of at least part of pores of the at least one surface. In some embodiments of the present application, the thickness of the inorganic layer is small, and when it is prepared by using a vapor deposition method, it not only can be deposited on the surface of the porous polymer substrate, but can also be further deposited on the inner walls of the pores of the porous substrate. With an increase in the coverage of the porous polymer substrate by the inorganic layer, inhibition effect of the porous polymer substrate to resist thermal shrinkage by the inorganic layer becomes more obvious, and the tensile strength of the separator is also increased accordingly, effectively improving safety of the cell. Further optionally, the inorganic layer is uniformly coated on the upper and lower surfaces of the porous substrate, and part of inner walls of pores of the upper and lower surfaces.

In the composite separator according to the first aspect of the present disclosure, a ratio of a depth of the pore coated with the inorganic layer to the thickness of the substrate is 1/1000-1/20. In the specific preparation process, for example, when a vapor deposition method is employed, a coating depth of the inorganic layer inside the porous polymer substrate gradually increases as an overall deposition thickness of the inorganic layer increases. However, when the coating depth is too large, for example, when the coating depth is greater than 1/20 of the thickness of the porous polymer substrate, it is easy for peripheries of the pores of the porous polymer substrate to be clogged by a large amount of the inorganic layer, which will deteriorate ion conduction performance of the battery. If the coating depth of the inorganic layer on the inner wall of the porous polymer substrate is too small, for example, smaller than 1/1000 of the thickness of the porous polymer substrate, a large amount of exposed polymer surface exists inside the porous polymer substrate. Thus, when heated, the constraining force of the inorganic layer is relatively low, and thermal shrinkage may occur easily.

In the composite separator according to the first aspect of the present disclosure, the substrate includes a material selected from a group consisting of polyethylene, polypropylene, polyvinylidene fluoride, aramid fiber, polyethylene glycol terephthalate, polytetrafluoroethylene, polyacrylonitrile, polyimide, polyamide, polyester, natural fiber or any combination thereof.

In the composite separator according to the first aspect of the present disclosure, the porosity of the substrate is 20%-80%, preferably 40%-70%. In the present disclosure, since the inorganic layer is deposited on the surface of the substrate and the inner walls of at least part of the pores of the surface, it is necessary to increase the porosity of the substrate in order to ensure that the composite separator has good ion-conduction performance, thereby preventing the dynamic performance of the battery from deteriorating after part of the pores are clogged by the inorganic layer.

In the composite separator according to the first aspect of the present disclosure, the pore-diameter of the substrate is 0.02 μm-0.5 μm.

In the composite separator according to the first aspect of the present disclosure, the relationship between the thickness $D1$ of the inorganic layer and the pore-diameter $D2$ of the substrate is: $0.3 \leq D1/D2 \leq 40$, preferably, $1 \leq D1/D2 \leq 33$. In the present disclosure, since the inorganic layer is deposited by the vapor deposition method, an outer surface and at least part of the inner walls of the substrate are coated with the inorganic layer, causing the pore-diameter of the substrate to become narrow. In order to ensure that the composite separator has favorable ion-conduction performance, it is necessary to match the thickness of the inorganic layer with the pore-diameter of the substrate, so that pore-channels from outside to inside of the substrate are not fully blocked by the inorganic layer, thereby ensuring that lithium-ions can pass through the separator in time. When the thickness of the inorganic layer reaches 40 times the pore-diameter of the porous substrate or higher, hydrophilicity will not be improved and thermal shrinkage of the composite separator will not be further inhibited. Instead, due to the fact that the pores on the substrate surface are substantially fully filled with the inorganic layer, the air permeability of the composite separator decreases, and therefore, the lithium-ion conductivity decreases accordingly, negatively affecting the dynamic performance of the battery. When the thickness of the inorganic layer is smaller than 0.3 times the pore-diameter of the porous substrate, the coating amount of the inorganic layer on the surface and inner walls of the pores of the porous substrate is too low relative to the exposed area in the porous substrate, therefore, in cases of being heated, the constraining force acting on the internal surface of the substrate by the inorganic layer is too small, while the thermal shrinkage percentage of the composite separator is still relatively high, leading to that the mechanical properties, such as the tensile strength, deflection and so on, of the composite separator are significantly reduced and the long-term cycling usage life and safety performance of the battery are not significantly improved.

In the composite separator according to the first aspect of the present disclosure, the thickness of the substrate is 5 μm-50 μm, preferably 7 μm-30 μm, more preferably 7 μm-15 μm. An upper limit of the thickness of the substrate can be 50 μm, 48 μm, 45 μm, 43 μm, 40 μm, 38 μm, 35 μm, 33 μm, 30 μm, 28 μm, 25 μm, or 23 μm; a lower limit of the thickness of the substrate can be 5 μm, 8 μm, 10 μm, 12 μm, 15 μm, 18 μm, 20 μm, or 22 μm. A range of the thickness of the substrate can be defined by any upper limit value and any lower limit value described above.

In the composite separator according to the first aspect of the present disclosure, the air permeability (Gurley) of the composite separator is between 130 s and 350 s. The air permeability (Gurley) of the separator is an important parameter for determining the ion conductivity of the separator. The separator in the present disclosure is a composite of an inorganic layer and a porous substrate. When the inorganic layer is relatively thin and is only tens of nanometer thick, the inorganic layer is mainly deposited on the surface of the substrate and the inner walls of the pores. As the inorganic layer continues to enter into the interior of the pores, the pore-diameter of the pores at the surface of the substrate gradually becomes smaller. With the gradual increase in the thickness of the inorganic layer, the inorganic layer begins to form a film layer on the pores at the surface of the substrate, and at this time, the lithium-ions need to pass through the inorganic layer before entering into the substrate of the separator. By designing the pore-diameter and the porosity of the porous substrate and the porosity and the pore-diameter of the inorganic layer, the air permeability of the composite separator is adjusted to be between 130 s and 350 s, thereby ensuring that the composite separator has favorable ion-conductivity performance and the battery using the composite separator has favorable dynamic performance and rate performance.

In the composite separator according to the first aspect of the present disclosure, after the composite separator is separately placed at 90° C. for 1 hour, both a transverse thermal shrinkage percentage and a longitudinal thermal shrinkage percentage of the composite separator are lower than 3%. To be further optimized, both the transverse thermal shrinkage percentage and the longitudinal thermal shrinkage percentage are lower than 2%, and still further, both the transverse thermal shrinkage percentage and the longitudinal thermal shrinkage percentage are lower than 1%.

Next, a preparation method of the separator according to the second aspect of the present disclosure will be described.

The preparation method of the separator according to the second aspect of the present disclosure includes: providing a substrate, wherein the substrate is a porous substrate; forming an inorganic layer on a surface of the substrate and in an interior of pores of the substrate by a vapor deposition method, wherein the inorganic layer a continuous dense film layer with porosity lower than 10%, a thickness of the inorganic layer is 20 nm-1000 nm, and an interfacial peeling force between the inorganic layer and the substrate is no less than 30 N/m.

In the preparation method of the separator according to the second aspect of the present disclosure, the method further includes performing surface pretreatment on the substrate prior to forming the inorganic layer. The surface pretreatment includes one or more of plasma activation, corona pretreatment, chemical pretreatment, or electron beam pretreatment, and preferably, the surface pretreatment is plasma activation or electron beam pretreatment.

In the preparation method of the separator according to the second aspect of the present disclosure, the vapor deposition method is a coating process selected from a group consisting of atomic layer deposition (ALD), chemical vapor deposition (CVD), physical vapor deposition (PVD), thermal evaporation, or any combination thereof. Preferably, plasma assisted thermal evaporation deposition, reactive ion beam sputtering deposition, electron beam evaporation, magnetron sputtering method, or plasma arc plating method is employed.

In the preparation method of the separator according to the second aspect of the present disclosure, the inorganic layer is prepared by chemical vapor deposition (CVD) through the reaction of an active gas and a gaseous precursor of the inorganic layer. The active gas is at least one of oxygen, ozone, carbon dioxide, water vapor, nitric oxide, nitrogen dioxide, or ammonia.

In the preparation method of the separator according to the second aspect of the present disclosure, the precursor of the inorganic layer is at least one of elementary aluminum, aluminum alloy, alkyl aluminum, aluminum nitrate, aluminum acetate, aluminum sulfate, elementary silicon, silicon alloy, alkyl silicon, silicon nitrate, silicon acetate, silicon sulfate, elementary titanium, titanium alloys, alkyl titanium, titanium nitrate, titanium acetate, titanium sulfate, elementary zinc, zinc alloy, alkyl zinc, zinc nitrate, zinc acetate, zinc sulfate, elementary magnesium, magnesium alloy, alkyl magnesium, magnesium nitrate, magnesium acetate, magnesium sulfate, elementary zirconium, zirconium alloy, alkyl zirconium, zirconium nitrate, zirconium acetate, zirconium sulfate, elementary calcium, calcium alloy, alkyl calcium, calcium nitrate, calcium acetate, calcium sulfate, elementary barium, barium alloy, alkyl barium, barium nitrate, barium acetate, or barium sulfate.

An electrochemical device including a positive electrode, a negative electrode, a separator and electrolyte is provided, and the separator is the composite separator described above.

Next, embodiments and comparative examples of the composite separator, the preparation method of the composite separator, and the lithium-ion secondary battery according to the present disclosure will be described.

Preparation of the Separator

In the embodiment of the present disclosure, material of the separator substrate is not particularly limited and the separator can be made of polymer. The above polymer can be one selected from a group consisting of polyethylene, polypropylene, or ethylene-propylene copolymer.

As for the preparation method of the inorganic layer of the composite separator, plasma-assisted thermal evaporation deposition technology is taken as an example. Heating source is electron beam, and heating target material is Al, Si, Mg, or the like. Under vacuum conditions, oxygen-containing active gas (such as oxygen, ozone, oxygen ions, nitric oxide, nitrogen dioxide, carbon dioxide, water vapor, etc.) is used as reaction gas, and temperature of the substrate is controlled to be lower than 100° C. By adjusting heating current (50 A-300 A), vacuum degree of a process chamber ($10^{-1}$-$10^{-3}$ Pa), oxygen flow rate (100 sccm-2000 sccm), plasma power (300 W-600 W) and process time, deposition rate of the inorganic layer on the substrate is adjusted, and further, a thickness, composition, and microstructure of the inorganic layer are adjusted.

Preparation of a Positive Electrode Plate

Positive electrode active material, conductive agent of acetylene black (SP), and binder of polyvinylidenefluoride (PVDF) are mixed with a weight ratio of 96:2:2. Solvent of N-methylpyrrolidone is added and then mixed and stirred evenly to obtain a positive electrode slurry. The positive electrode slurry is evenly coated on the positive electrode current collector aluminum foil and then dried at 85° C. After that, cold pressing, edge-cutting, slitting, and stripping are performed, followed by drying at 85° C. under vacuum for 4 hours, so that the positive electrode plate is obtained. Additionally, the positive electrode active material used can be a layered lithium transition metal oxide, lithium-rich manganese oxide, lithium iron phosphate, lithium cobaltate, or a doped or coated positive electrode active material thereof. In this embodiment, the layered lithium transition metal oxide $LiNi_{0.8}Co_{0.1}Mn_{0.1}O_2$ is taken as an example.

Preparation of a Negative Electrode Plate

Negative electrode active material of artificial graphite, conductive agent of acetylene black, binder of styrene butadiene rubber (SBR) and thickener of sodium carboxymethyl cellulose (CMC) are mixed with a weight ratio of 96:1:2:1. Solvent of deionized water is added and then mixed and stirred evenly to obtain a negative electrode slurry. The negative electrode slurry is evenly coated on the negative electrode current collector copper foil and then dried at 80-90° C. After that, cold pressing, edge-cutting, slitting, and stripping are performed, followed by drying at 110° C. under vacuum for 4 hours, so that the negative electrode plate is obtained.

Preparation of Electrolyte

A basic electrolyte solution including dimethyl carbonate (DMC), ethyl methyl carbonate (EMC) and ethylene carbonate (EC) with a weight ratio of 5:2:3 is prepared. Then electrolyte salt is added so that concentration of lithium hexafluorophosphate in the electrolyte solution is 1 mol/L.

Preparation of a Lithium-Ion Battery

The negative electrode plate, the separator and the positive electrode plate are stacked in this order and wound to form a square bare cell with a thickness of 8 mm, a width of 60 mm, and a length of 130 mm, the separator being placed between the positive electrode plate and the negative electrode plate, coating on one surface of the separator facing the positive electrode plate. The bare cell is placed into an aluminum foil packing bag, and vacuum baked at 75° C. for 10 h, and then, non-aqueous electrolyte is injected. After vacuum encapsulation is conducted, let it stand by for 24 h. Then, it is charged to 4.2V with a constant current of 0.1 C (160 mA), and after that, it is charged at a constant voltage of 4.2V until the current drops to 0.05 C (80 mA). Then it is discharged to 3.0V with the constant current of 0.1 C (160 mA). Charging and discharging are repeated twice, and finally it is charged to 3.8V with the constant current of 0.1 C (160 mA). In this way, preparation of the lithium-ion secondary battery is completed.

EMBODIMENTS AND COMPARATIVE EXAMPLES

The following numbered separators are prepared by the above preparation method for the separator. In addition, the above method is employed to prepare the following numbered lithium-ion batteries (to which these numbered separators are applied respectively). Separators S1-S12 are embodiments of the present disclosure, and Separators D1-D4 are comparative examples of the present disclosure.

Specific parameter information of Separators S1-S12 and Separators D1-D4 can be found in Table 1 and the thickness, composition, porosity, etc. of the inorganic layer of the separators can be achieved by adjusting the preparation process parameters.

TABLE 1

| Battery No. | Separator No. | Substrate Material | Substrate Thickness | Substrate Porosity | Inorganic Layer Thickness | Inorganic Layer Porosity | Inorganic Layer Material |
|---|---|---|---|---|---|---|---|
| SC1 | S1 | Polyethylene/Polypropylene | 5 μm | 40% | 20 nm | 1% | Aluminum oxide |
| SC2 | S2 | Polyethylene | 8 μm | 50% | 100 nm | 2% | Magnesium oxide |
| SC3 | S3 | Polypropylene | 10 μm | 60% | 200 nm | 3% | Aluminum oxide |
| SC4 | S4 | Polyethylene/Polypropylene | 20 μm | 45% | 300 nm | 4% | Zirconium oxide |
| SC5 | S5 | Polyethylene/Polypropylene | 18 μm | 40% | 400 nm | 5% | Aluminum oxide |
| SC6 | S6 | Polyethylene/Polypropylene | 18 μm | 40% | 500 nm | 6% | Aluminum oxide |
| SC7 | S7 | Polyethylene/Polypropylene | 18 μm | 40% | 650 nm | 7% | Aluminum oxide |
| SC8 | S8 | Polypropylene | 25 μm | 45% | 850 nm | 7.5% | Aluminum oxide |
| SC9 | S9 | Polyethylene/Polypropylene | 16 μm | 60% | 1000 nm | 8% | Silicon oxide |
| SC10 | S10 | Polyethylene/Polypropylene | 30 μm | 55% | 450 nm | 8.5% | AlO(OH) |
| SC11 | S11 | Polypropylene | 50 μm | 40% | 450 nm | 9% | Titanium oxide |
| SC12 | S12 | Polypropylene | 18 μm | 40% | 450 nm | 9.5% | Aluminum oxide |
| DC1 | D1 | Polyethylene | 18 μm | 40% | — | — | — |
| DC2 | D2 | Polyethylene | 18 μm | 40% | 1500 nm | 4% | Aluminum oxide |
| DC3 | D3 | Polyethylene | 18 μm | 40% | 300 nm | 15% | Aluminum oxide |
| DC4 | D4 | Polyethylene | 18 μm | 40% | 10 nm | 5% | Aluminum oxide |

Where "-" indicates that the inorganic layer is not contained.

Finally, test procedures and test results of the separators and the lithium-ion secondary batteries will be described.

(1) Interfacial Peeling Force Test

Under room temperature and normal pressure conditions, 3M double-sided adhesive is used and evenly attached to a stainless steel plate. Then, a test sample with a width of 2 cm is evenly attached to the double-sided adhesive, a tensionmeter is used to peel the sample off from the steel plate, and the maximum pulling force F (N) is read according to a data diagram of the pulling force and the displacement. The measured bonding force is F/0.02.

(2) Test of Thermal Shrinkage Percentage of the Separator

The composite separator is cut into a 100 mm long, 100 mm wide square sample, and marked with a longitudinal direction (MD) and a transverse direction (TD). After that, a projection tester is used to test the lengths in the MD and TD directions and the lengths are recorded as L1 and L2. The separator is then placed in an air-circulating oven at 150° C. for one hour and then taken out. The projection tester is used again to test the lengths in the MD and TD directions and these lengths are recorded as L3 and L4.

Thermal shrinkage percentage of the separator in the MD direction=$(L1-L3)/L1 \times 100\%$;

Thermal shrinkage percentage of the separator in the TD direction=$(L2-L4)/L2 \times 100\%$.

(3) Test Method of Air Permeability

Under a condition with temperature of 15-28° C. and humidity lower than 80%, the test sample is made into a size of 4 cm×4 cm, and an air permeability value is directly obtained through an Air-permeability-tester using Gurley test (100 cc) method.

(4) Test Method of Porosity

The test sample is dried in a vacuum oven at 105° C. for 2 hours and then, it is taken out and cooled in a desiccator, and then is tested. The separator is wrapped evenly with an A4 paper, tiled on a cutting die, and punched with a punch machine. In this way, the sample is prepared well for testing. First of all, a micrometer is used to measure the thickness of the sample, and an apparent volume V1 of the sample is calculated based on a surface area and the thickness of the sample. Then, an AccuPyc II True Density Meter is used to measure an actual volume V2 of the sample, and thus, the porosity can be obtained, that is, Porosity=$(V1-V2)/V1 \times 100\%$.

(5) Tensile Strength Test of the Separator

The test sample with a fixed thickness of T is respectively die-cutted along MD (length direction)/TD (width direction) using the cutting die to form sheets with a size of 100*15 mm. Then, the sheet is placed to be perpendicular to a clamping chuck of the tensionmeter, and is fixed and tightened with an upper and lower chucks with both initial heights of 5 cm. A tensile rate is set to be 50 mm/min, and the maximum pulling force measured is F.

Tensile strength=$F/9.8/(15 \text{ mm}*T)$

Tensile strength in MD direction (not lower than 1200 kgf/cm$^2$)

Tensile strength in TD direction (not lower than 1200 kgf/cm$^2$)

(6) Capacity Test of the Lithium-Ion Secondary Battery

In an thermostat at 25° C., the battery is charged to a voltage of 4.2V at a constant current with a rate of 1 C, and then charged at a constant voltage of 4.2V to a current of 0.05 C. After that, it is discharged to a voltage of 2.8V at a constant current with a rate of 1 C, and in this way, the obtained discharge capacity is the capacity of the battery.

(7) Test of Normal Temperature Cycle Performance of the Lithium-Ion Secondary Battery At 25° C., the battery is charged to a voltage of 4.2V at a constant current with a rate of 0.7 C, and then it is charged with a constant voltage of 4.2V to a current of 0.05 C. After that, it is discharged at a constant current of 1 C to a voltage of 2.8V. The above is a charge-discharge cycle process, and this charge-discharge cycle process is repeated 1000 times.

A capacity retention rate after the Nth cycle=discharge capacity after the Nth cycle/discharge capacity after the first cycle×100%.

(8) Hi-Pot Reject Rate Test:

The wound and welded bare cell is hot-pressed at 90° C. and 0.5 MPa for 150 s. After being hot pressed, a 200V voltage is applied between the positive and negative electrode tabs of the bare cell using a Hioki Internal Resistance Tester to test the resistance. If the resistance is <10 MΩ, the bare cell is considered as a Hi-pot reject, otherwise, the bare cell passes the Hi-pot test.

The experimental results of the physical properties of the above separators are shown in Table 2.

TABLE 2

| No. | Interfacial Peeling Force N | Nailing Strength gf | Thermal Shrinkage percentage | | Air Permeability s | Porosity | Tensile Strength | |
|---|---|---|---|---|---|---|---|---|
| | | | MD Direction % | TD Direction % | | | MD Direction kgf/cm² | TD Direction kgf/cm² |
| Separator S1 | 37 | 307 | 1.96 | 0.19 | 140 | 39.8% | 1268 | 1349 |
| Separator S2 | 35 | 313 | 1.43 | −0.12 | 164 | 49.4% | 1372 | 1368 |
| Separator S3 | 32 | 322 | 0.98 | −0.09 | 172 | 58.9% | 1221 | 1258 |
| Separator S4 | 36 | 332 | 0.73 | −0.13 | 187 | 44.4% | 1306 | 1333 |
| Separator S5 | 38 | 315 | 0.52 | −0.11 | 212 | 39.2% | 1341 | 1241 |
| Separator S6 | 39 | 330 | 0.53 | −0.08 | 217 | 39.1% | 1330 | 1293 |
| Separator S7 | 30 | 317 | 0.40 | 0.20 | 232 | 38.8% | 1330 | 1389 |
| Separator S8 | 32 | 314 | 0.21 | −0.18 | 241 | 43.8% | 1324 | 1209 |
| Separator S9 | 33 | 323 | 0.54 | 0.01 | 246 | 56.9% | 1366 | 1277 |
| Separator S10 | 32 | 336 | 0.61 | 0.07 | 215 | 54.3% | 1264 | 1388 |
| Separator S11 | 37 | 324 | 0.35 | 0.02 | 211 | 39.7% | 1311 | 1398 |
| Separator S12 | 34 | 314 | 0.51 | 0.05 | 208 | 39.3% | 1353 | 1229 |
| Separator D1 | — | 246 | 3.20 | 0.40 | 108 | 40.0% | 1226 | 1368 |
| Separator D2 | 35 | 333 | 0.25 | 0.21 | 321 | 37.2% | 1389 | 1365 |
| Separator D3 | 32 | 291 | 3.12 | 0.41 | 196 | 39.0% | 1238 | 1212 |
| Separator D4 | 32 | 283 | 0.43 | 0.20 | 137 | 40.0% | 1398 | 1311 |

Experimental results of the performance of the lithium-ion secondary batteries prepared using the above separators are shown in Table 3.

TABLE 3

| No. | | Battery Capacity/ mAh | Capacity Retention Rate | Hi-pot Reject Rate |
|---|---|---|---|---|
| Battery SC1 | Separator S1 | 1617 | 89.3% | 13.3% |
| Battery SC2 | Separator S2 | 1617 | 89.2% | 9.4% |
| Battery SC3 | Separator S3 | 1664 | 90.2% | 7.4% |
| Battery SC4 | Separator S4 | 1680 | 91.1% | 3.0% |
| Battery SC5 | Separator S5 | 1691 | 90.9% | 3.6% |
| Battery SC6 | Separator S6 | 1643 | 89.2% | 2.9% |
| Battery SC7 | Separator S7 | 1645 | 91.2% | 3.7% |
| Battery SC8 | Separator S8 | 1654 | 89.9% | 3.2% |
| Battery SC9 | Separator S9 | 1688 | 90.5% | 3.1% |
| Battery SC10 | Separator S10 | 1676 | 90.2% | 4.8% |
| Battery SC11 | Separator S11 | 1679 | 90.7% | 5.0% |
| Battery SC12 | Separator S12 | 1688 | 90.2% | 5.1% |
| Battery DC1 | Separator D1 | 1632 | 85.2% | 45.0% |
| Battery DC2 | Separator D2 | 1623 | 86.3% | 4.3% |
| Battery DC3 | Separator D3 | 1608 | 89.1% | 7.6% |
| Battery DC4 | Separator D4 | 1622 | 87.2% | 25.7% |

As can be seen from the above embodiments, when the battery adopts the separators prepared in the embodiments of the present disclosure, as shown in FIG. 1 (a SEM photograph (5000×) of a cross-section of a specific composite separator in the embodiment of the present disclosure), the inorganic layer is a continuous dense film layer, whose physical properties, such as film-substrate bonding force, nailing strength, thermal shrinkage percentage, air permeability are very favorable, in addition, the Hi-pot reject rate is very low, indicating that the separators of the embodiments of the present disclosure can improve safety of the battery and increase the cycle life. On the contrary, when the inorganic layer is not provided or the inorganic layer is too thin, the cycle performance of the battery deteriorates and the capacity retention rate is relatively low, moreover, the Hi-pot reject rate is extremely high (please refer to Batteries SD1, SD4). When the inorganic layer is too thick, although the Hi-pot reject rate is relatively low, the cycle performance of the battery deteriorates and the capacity retention is relatively low (please refer to Battery SD2). When the porosity of the inorganic layer is too high, even if the thickness of the inorganic layer is suitable and the Hi-pot reject rate is not high, the cycle performance of the battery deteriorates and the capacity retention rate is relatively low (please refer to Battery SD3).

Although the present disclosure is disclosed with the preferred embodiments above, these embodiments are not intended to limit the claims, and any person skilled in the art may make several possible changes and modifications without departing from the conception of the present disclosure. Therefore, the protection scope of the present disclosure should be defined by the scope of the claims of the present disclosure.

What is claimed is:

1. A composite separator comprising:
   (a) a substrate with a porous structure, and
   (b) an inorganic layer provided on at least one surface of the substrate,
   wherein the inorganic layer is an inorganic dielectric layer which is a continuous dense film layer with porosity lower than 10% and contains no binder, a thickness of the inorganic layer is 20 nm-1000 nm, and an interfacial peeling force between the inorganic layer and the substrate is no less than 30 N/m,
   wherein the inorganic layer is uniformly coated on the surface of the porous substrate and inner walls of at least a part of pores; and a ratio of a depth of the pores coated with the inorganic layer to a thickness of the porous substrate is 1/1000-1/20, and
   wherein the composite separator has a puncture resistance of at least 300 gram force.

2. The composite separator according to claim 1, wherein the inorganic layer contains a material having electron-isolation property and ion-conduction performance, and the material is at least one of inorganic oxide, inorganic fluoride, inorganic nitride, or inorganic hydroxide.

3. The composite separator according to claim 2, wherein the inorganic layer contains at least one of aluminum oxide, hydrated alumina, silicon oxide, silicon nitride, titanium oxide, titanium nitride, zinc oxide, zinc nitride, magnesium oxide, magnesium nitride, zirconium oxide, zirconium nitride, calcium oxide, calcium nitride, barium oxide, or barium nitride.

4. The composite separator according to claim 1, wherein the substrate comprises a material selected from a group consisting of polyethylene, polypropylene, polyvinylidene fluoride, aramid fiber, polyethylene glycol terephthalate, polytetrafluoroethylene, polyacrylonitrile, polyimide, polyamide, polyester, natural fiber or any combination thereof.

5. The composite separator according to claim 1, wherein a porosity of the substrate is 20%-80%.

6. The composite separator according to claim 1, wherein a pore diameter of the substrate is 0.02 μm-0.5 μm.

7. The composite separator according to claim 1, wherein a thickness of the substrate is 5 μm-50 μm.

8. The composite separator according to claim 1, wherein air permeability of the composite separator is between 130 s and 350 s.

9. The composite separator according to claim 1, wherein after the composite separator is placed at 90° C. for 1 hour, both a transverse thermal shrinkage percentage and a longitudinal thermal shrinkage percentage are lower than 3%, preferably lower than 2%, more preferably lower than 1%.

10. An electrochemical device comprising a positive electrode, a negative electrode, a separator and electrolyte, wherein the separator is the composite separator according to claim 1.

11. The composite separator according to claim 5, wherein the porosity of the substrate is 40%-70%.

12. The composite separator according to claim 7, wherein the thickness of the substrate is 7 μm-30 μm.

13. The composite separator according to claim 12, wherein the thickness of the substrate is 7 μm-15 μm.

14. The composite separator according to claim 9, wherein the longitudinal thermal shrinkage percentage is lower than 2%.

15. The composite separator according to claim 14, wherein the longitudinal thermal shrinkage percentage is lower than 1%.

* * * * *